United States Patent Office 2,796,322
Patented June 18, 1957

2,796,322

PREPARATION OF CHLORIMIDOMETA-PHOSPHATES

Maurice C. Taylor, Niagara Falls, N. Y.

No Drawing. Application April 5, 1954,
Serial No. 421,157

5 Claims. (Cl. 23—50)

The present invention relates to chlorimidometaphosphates and particularly to a method for preparing such products.

In my pending application for patent, Serial No. 362,168, filed June 16, 1953, I have described the chlorimidometaphosphates and various methods of preparing them. These methods involve essentially reaction of imidophosphoric acid or a metal salt thereof with an alkali metal hypochlorite, followed by addition of acid to adjust the pH to pH 7 in those instances where the reaction is effected by reacting the hypochlorite upon a metal salt of an imidophosphate.

The methods of preparing the chlorimidometaphosphates described in said Serial No. 362,168 are excellently effective in producing the desired chlorimido compound. However, close control over the acidification technique is required as local excess of acid appears to cause some degradation of the acid sensitive chlorimido products with production of unwanted chlorine containing products which carry over into the finished product in small amounts and which tend adversely to affect the stability thereof.

It is an object of the present invention to provide a method for preparing chlorimidometaphosphates wherein the desired end product is formed under alkaline conditions.

It is a further object of the invention to provide an improved method for the production of chlorimidometaphosphates wherein an end product of exceptional purity and stability results.

It is also an object of the invention to provide an economic procedure for manufacturing chlorimidometaphosphates with a minimum of manipulative procedure and minimum consumption of chemicals.

In broad concept, the objects of the invention are attained by reacting an organic hypochlorite with a metal salt of an imidophosphate. The reaction products are an alcohol and a chlorimidophosphate. The alchol is separated from the chlorimidophosphate and may be reused in the process after esterification with hypochlorous acid.

In general, the operation is carried out by adding the organic hypochlorite to a water dispersion of the imidophosphate contained in a reaction vessel equipped with cooling means and with agitating means. The chemical reaction is carried out under non-acid conditions and preferably at a pH above 7. Addition of a slight amount of alkali to produce a reaction environment possessing a pH in the range pH 9 to 12 is advantageous in facilitating reaction.

The organic hypochlorite is preferably an ester of hypochlorous acid and a lower aliphatic alcohol; that is, an aliphatic alcohol containing less than ten carbon atoms. The alcohol may contain aryl substituent groups. The following hypochlorite esters, among others, may be employed: ethyl hypochlorite, propyl hypochlorite, tertiary butyl hypochlorite, tertiary amyl hypochlorite and phenylethyl hypochlorite. The hypochlorite esters may be used as such or dissolved in an organic solvent inert to the action of the hypochlorite ester as, for instance, the chlorinated organic solvents such as carbontetrachloride or ethylene dichloride.

The metal salt of the imidophosphate used in the reaction will generally be an alkali metal salt or an alkaline earth metal salt. For most commercial prepaartion, the sodium salt will be selected.

In the examples listed below, specific modes of reaction have been illustrated employing tertiary butyl hypochlorite for reaction with the sodium salt of a polyimidometaphosphate, as tetrasodium tetraimidometaphosphate in Examples 1 and 2, and trisodium tri-imidometaphosphate in Example 3.

The general reaction may be represented in the following equation where R is an alkyl or aryl substituted alkyl radical and $n$ is the degree of polymerization of the imidophosphate and being 3:7 as in Serial No. 362,168. Thus in the equation representing the reaction of Examples 1 and 2, $n$ is 4, while in Example 3, $n$ is 3.

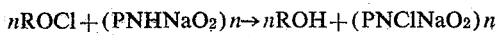

$$nROCl + (PNHNaO_2)n \rightarrow nROH + (PNClNaO_2)n$$

It will be understood that the following examples are given merely as illustrative of the principles of the invention and not as limitative thereof.

*Example 1*

25 g. of tetrasodium tetraimidometaphosphate and 32 ml. of water were placed in a glass reaction vessel provided with a stirrer and surrounded by an ice bath. The pH was brought to 11.2 by the addition of 2 ml. of 30% caustic soda solution. Then 24.5 ml. of tertiary butyl hypochlorite were added gradually keeping the temperature between 20° C. and 30° C. The reaction occurred promptly. After reaction, the pH of the mixture was lowered to 7 by the addition of one ml. of glacial acetic acid. The mixture was cooled to 10° C. and the chlorimine crystals separated by filtration and then dried in a vacuum at 60° C. to give 21 g. of product containing 46.5% available chlorine. The filtrate comprised two layers. The alcohol layer was separated off to be used over again. The water layer contained about 2 g. of available chlorine as chlorimine which was recovered by precipitation with ethyl alcohol, filtering and drying.

*Example 2*

This example was carried out as in Example 1 except that after the reaction had occurred the whole contents of the reactor, without any addition of acetic acid, was placed in a vacuum evaporator and evaporated to dryness. The butyl alcohol and water vaporized leaving only the chlorimine product. 31 g. of product were obtained containing 41.4% available chlorine.

*Example 3*

10 g. of trisodium tri-imidometaphosphate and 13 ml. of water were placed in the reaction vessel. The pH was brought to 11.8 by the addition of 30% sodium hydroxide solution. Then 9.5 ml. of tertiary butyl hypochlorite were added. After reaction had occurred the pH was adjusted to 7.2 with acetic acid. Three volumes of ethyl alcohol were added to precipitate the chlorimine which was filtered off and dried in vacuum to give 10 g. of product containing 47.1% available chlorine.

In the reactions discussed above, the desired chlorimidophosphate dissolves in the water layer or crystallizes and precipitates, depending on the amount of water present and the solubility of the particular chlorimide being prepared. If the alcohol produced as a reaction product is insoluble in the aqueous chlorimide solution, the alcohol will be present as the supernatant layer which can be readily drawn off and employed to prepare the hypochlorite ester for the next batch.

If the formed alcohol be soluble in the chlorimide solution, the alcohol may be recovered by distilling the mixture whereby the alcohol passes into the distillate and the chlorimide remains in the still as a solid product.

What is claimed is:

1. The method of producing a polymerized chlorimidometaphosphate having a degree of polymerization of 3:7 which comprises agitating a lower alkyl hypochlorite in a non-acidic environment comprising an aqueous medium with a metal salt of polymerized imidometaphosphoric acid having a degree of polymerization of 3:7, the metal being selected from the group consisting of the alkali metals and alkaline earth metals including magnesium, and then removing liquid from the solid polychloroimidometaphosphate.

2. The method of producing a polymerized chlorimidometaphosphate having a degree of polymerization of 3:7 which comprises agitating a lower alkyl hypochlorite in a non-acidic environment comprising an aqueous medium at a pH in the range pH 7 to pH 12, with a metal salt of polymerized imidometaphosphoric acid having a degree of polymerization of 3:7, the metal being selected from the group consisting of the alkali metals and alkaline earth metals including magnesium, and then removing liquid from the solid polychlorimidometaphosphate.

3. The method of producing a polymerized chlorimidometaphosphate having a degree of polymerization of 3:7 which comprises agitating tertiary butyl hypochlorite in a non-acidic environment comprising an aqueous medium with a metal salt of polymerized imidometaphosphoric acid having a degree of polymerization of 3:7, the metal being selected from the group consisting of the alkali metals and alkaline earth metals including magnesium, and then removing liquid from the solid polychlorimidometaphosphate.

4. The method of producing a polymerized chlorimidometaphosphate having a degree of polymerization of 3:7 which comprises agitating tertiary butyl hypochlorite in a non-acidic environment comprising an aqueous medium with tetrasodium tetraimidometaphosphate and then removing liquid from the solid polychlorimidometaphosphate.

5. The method of producing a polymerized chlorimidometaphosphate having a degree of polymerization of 3:7 which comprises agitating tertiary butyl hypochlorite in a non-acidic environment comprising an aqueous medium with trisodium tri-imidometaphosphate and then removing liquid from the solid polychlorimidometaphosphate.

References Cited in the file of this patent

UNITED STATES PATENTS

| | | |
|---|---|---|
| 1,988,991 | Albertshauser | Jan. 22, 1935 |
| 2,360,492 | Hampel | Oct. 17, 1944 |
| 2,536,456 | Miller | Jan. 2, 1951 |

OTHER REFERENCES

Mellor: "Comprehensive Treatise on Inorganic and Theoretical Chemistry," published by Longmans, Green and Co. New York, vol. 8, 1928, pages 716 to 720.